July 7, 1959 R. H. LONG 2,893,368
STARTER CONTROL MECHANISM
Filed Dec. 2, 1954

INVENTOR.
RICHARD H. LONG
BY
H.O. Clayton
ATTORNEY

United States Patent Office 2,893,368
Patented July 7, 1959

2,893,368

STARTER CONTROL MECHANISM

Richard H. Long, South Bend, Ind., assignor to Bendix Aviation Corporation, South Bend, Ind., a corporation of Delaware Application December 2, 1954, Serial No. 472,608

7 Claims. (Cl. 123—179)

This invention relates in general to a mechanism for starting the internal combustion engine of an automotive vehicle and more particularly to a mechanism for facilitating a quick restarting of said engine following its failure to operate due to malfunction thereof.

Vehicles equipped with automatic transmissions or fluid couplings have a tendency to stall if the accelerator is opened momentarily and then closed shortly thereafter, this operation being probably due to a so-called loading up of the carburetor; for with such a stall a restarting of the engine requires returning the selector lever of the transmission to its neutral position followed by an operation of the starter switch. As to the selector lever operation in such a vehicle it is assumed that the driver usually actuates said lever, to prepare the transmission for a movement of the vehicle, immediately after the engine is started. The aforementioned operations, necessary to recrank the engine, are indeed unhandy; particularly under the stress of possibly blocking traffic. Accordingly the present invention has to do with the provision of means for restarting the engine of an automotive vehicle after the engine has stalled and with the transmission set for a motion of the vehicle; and the principal virtue of this mechanism lies in the simplicity of its operation to effect this result.

Yet another object of my invention is to provide, in an automotive vehicle provided with a fluid coupling and a transmission having a neutral setting and a plurality of other settings to effect either a forward or backward movement of the vehicle, a relatively simple electrical mechanism for controlling the starter motor of the mechanism for starting the internal combustion engine of said vehicle, said electrical mechanism serving, with but a single operation by the driver, to restart the engine after the same has been stalled.

A further object of my invention is to provide, in an automotive vehicle including a manually operated control for the transmission of the vehicle, an accelerator operated starter switch, and an engine starter mechanism normally operated when the transmission is in neutral, an electrical engine cranking mechanism including a manifold vacuum operated switch. This mechanism is operative, with a closing of the engine starter switch, to energize the engine starter mechanism of the vehicle and thereby recrank the engine after the latter has been stalled with the transmission established in a setting other than neutral.

Although only one embodiment of the invention has been illustrated and described, various changes in the form and relative arrangement of the parts may be made to suit requirements.

Figure 1:
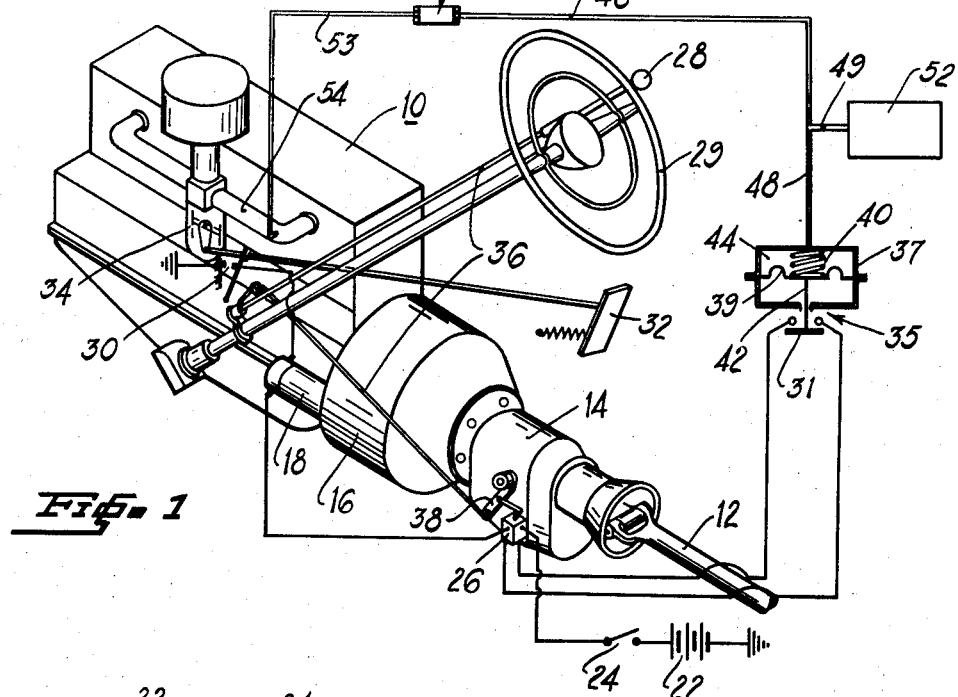
Figure 1 is a view disclosing the internal combustion engine of an automotive vehicle and the mechanism of my invention for restarting said engine after the same has been stalled with the transmission of the vehicle established in a setting other than neutral.

There is disclosed in the three figures of the drawing a preferred embodiment of my invention. Referring to Figure 1 an internal combustion engine 10 of an automotive vehicle is drivably connected to a propeller shaft 12 of said vehicle by means including a transmission mechanism 14 which may be of the automatic type; and this transmission cooperates with means including a fluid coupling 16 in providing the desired driving connection between the engine and the propeller shaft. The engine 10 is started by mechanism including a starter motor 18 and energization of said motor results in a cranking of the engine. This mechanism is well known to those skilled in this art; accordingly the same is not disclosed in detail.

My invention has to do with the means employed for energizing the starter motor 18 to initiate the operation of restarting of the engine within a limited time after the same has been stopped, the transmission 14 at the time being established in a setting to effect either a forward or backward movement of the vehicle; in other words any setting of the transmission except neutral. As stated in the objects of my invention vehicles equipped with automatic transmissions or fluid couplings have a tendency to stall if the accelerator is opened momentarily and then closed shortly thereafter; and of course this may also happen if the transmission cooperating with my invention is of the selective gear type such as a three speeds forward and reverse transmission. The latter type of transmission may be combined, in the power plant of the vehicle, with a manually or power operated clutch operating mechanism; and said transmission may be combined with a fluid coupling.

Figure 2:
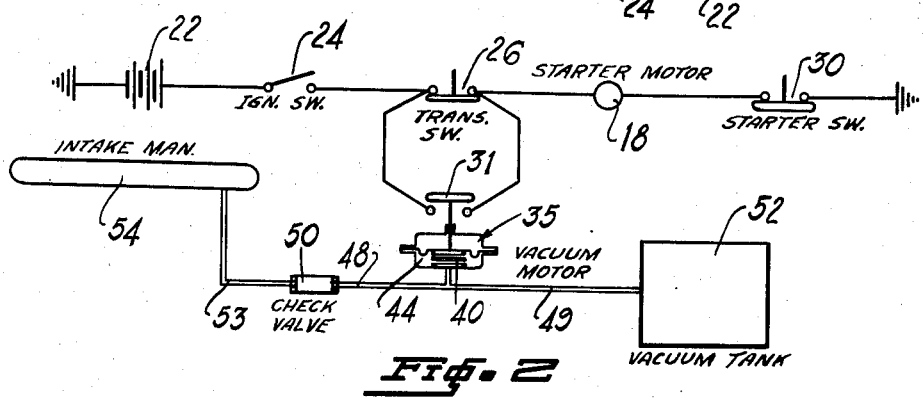
Figure 2 is a view disclosing the electrical hookup of the engine restarter mechanism of Figure 1.

Now preliminary to cranking the engine the driver will, of course, place the transmission in its neutral setting and close the ignition switch indicated by the reference numeral 24 in Figure 2; and having done this he will then operate the engine starter mechanism to crank the engine. He will then, assuming he desires the car to move forwardly, actuate the transmission operating mechanism, say a shift lever 28 mounted adjacent a steering wheel 29, to establish the transmission in a setting to make possible the desired forward motion of the car. However, after the transmission has been established in this forward setting, the engine may stall when the accelerator is momentarily opened and then released either all or part way; and this may happen before the car is placed in motion or shortly thereafter; say when driving through a street intersection.

Should this happen, it would then be necessary for the driver of the car to reestablish the transmission in its neutral setting prior to again cranking the engine; for the engine starter mechanism of my invention includes a normally open transmission operated switch 26 which is closed only when the transmission is established in its neutral setting. However, with my invention the operation of reestablishing the transmission in neutral is unnecessary; it being merely necessary to again actuate the hereinafter described manually operated starter switch to recrank the engine.

Referring now to the drawing for a detailed disclosure of a preferred embodiment of my invention the aforementioned starter motor 18 is electrically connected in series with a grounded battery 22, the ignition switch 24 of the car, the normally open switch 26 which is closed when the transmission operating shift lever 28 is placed in its transmission neutral setting, and a grounded accelerator operated starter switch 30 of any well known design such as that of the so-called vacuum interlocked type. Such a switch mechanism, no claim to which is made, will be automatically opened, after the engine is started, by the operation of power means and despite the driver continuing to hold the accelerator depressed sufficiently to close said switch. The accelerator 32 of the car is disclosed in Figure 1, said accelerator serving to operate a carburetor 34 of any well known design. The shift lever 28 if connected to the transmission by a linkage 36 including a crank 38 for operating the switch 26 and the transmission.

Describing now an important feature of my invention means are provided by-passing the switch 26, for closing the electrical circuit between the starter motor 18 and the battery 22. This mechanism preferably includes a normally open vacuum-operated switch 31 electrically connected in parallel with the switch 26 in the electrical connection between the starter motor 18 and the battery 22. The switch 31 is preferably controlled by a single acting vacuum-operated motor 35 which includes a casing 37, a power element 39, a spring 40 biasing the element 39 downwardly, Figure 1, and a rod 42 connecting the element 39 with the movable contact of the switch 31. The vacuum chamber 44 of the motor 35 is connected to a conduit 48; and the latter is connected to a motor controlling spring and pressure differential power operated check valve 50. A conduit 49 interconnects the conduit 48 and a vacuum tank 52. The check valve is connected, by a conduit 53, to the intake manifold 54 of the engine 10.

Figure 3:
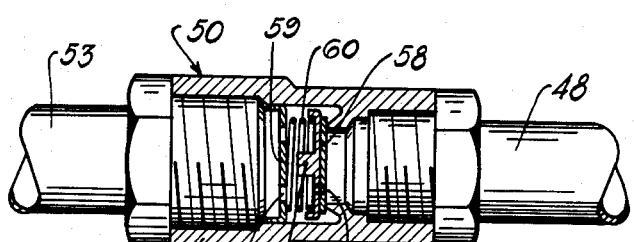
Figure 3 is a sectional view disclosing the details of the check valve of my invention.

The check valve 50, Figure 3, preferably includes a casing 56 housing a floating valve member 58, a spring 60 biasing the member 58 to its valve closed position, is inserted between the valve member 58 and a stop 59 having openings 61 therein. The member 58 is provided with a relatively small bleed orifice 62 making possible a controlled flow of air from the manifold to the tank 52 and to the vacuum chamber 44 of the motor 35.

Describing in part the operation of the switch 31 and the check valve 50, the spring 40, Figure 2, serves to bias said switch to its open position; however, when the engine 10 is started, the pumping action of its pistons serves to create a partial vacuum in the intake manifold 54 and this results in an energization of the motor 35 to close said switch. Explaining this operation, air flows from the chamber 44 of the motor 35 and from the tank 52 into the manifold via the unseated check valve 50, the valve member 58 leaves its seat, thus permitting air to flow through the openings 61 in the stop 59. The degree of movement of the member 58 off its seat is limited by a projection 63 extending from said member; this projection contacts the stop 59.

Briefly describing the complete operation of the starter mechanism of my invention, to start the engine the driver will close the ignition switch 24 and actuate the shifter lever 28 to place the transmission in neutral thereby closing the switch 26. The accelerator is then depressed sufficiently to close the switch 30; and this operation results in a cranking of the engine. The driver will, either immediately before, concurrently with, or immediately after he releases the accelerator, actuate the shift lever to establish the transmission in a setting preparatory to effecting a motion of the vehicle, said operation opening the switch 26; and to get the vehicle under way the driver will then again depress the accelerator to open the engine throttle. With the embodiment of my invention disclosed in the drawings, should the engine stall after the transmission has been established in the latter position and immediately after the accelerator has been released sufficiently to open the switch 30, the driver, to recrank the engine, need but to again depress the accelerator sufficiently to again close the switch 30; for, as will be noted from the description given above, at the time the engine stops running the switch 31 is closed thereby providing an electrical circuit between the accelerator operated grounded switch 30 and the grounded battery 22. It follows therefore that the driver's depression of the accelerator to close the switch 30 results in an immediate recranking of the engine. The transmission operated switch 26 may and probably is at the time open; for the aforementioned engine stall will probably happen when the transmission is in gear, the car at the time, being located in the middle of a street intersection or approaching said intersection at a relatively low speed.

Now, with the mechanism of my invention the driver must execute this recranking operation a relatively short time after the engine stalls; for after said stall the air pressure within the manifold 54 almost immediately goes back to atmospheric; and when this occurs air immediately flows from the manifold to the chamber 44 and tank 52, thereby making possible an expansion of the spring 40 to open the switch 31. However the relatively small orifice 62 in the then seated check valve so controls this flow of air that it takes approximately 60 seconds to increase the air pressure in the chamber 44 a sufficient amount to allow the spring 40 to expand; and this one minute gives the driver sufficient time to recrank the engine.

There is thus provided, by my invention, an engine starter mechanism operative, with the depression of a starter switch such as the accelerator operated switch 30 disclosed herein, to effect a quick recranking of the engine should the same stall after the transmission has been established in a position to effect a movement of the vehicle. The time available for performing the latter operation, is controlled by the presence or absence of the vacuum tank 52, the pressure of the air in the manifold developed immediately after the stalling of the engine, and other factors. If the driver of the car does not perform this simple switch closing operation in the time available, approximately one minute, then starting the engine will require returning the shift lever to its transmission neutral setting thereby retaining the safety feature for which the neutral switch 26 was originally incorporated in the mechanism.

I claim:

1. In an automotive vehicle provided with an accelerator, an internal combustion engine and a transmission mechanism which may be established in a neutral setting or in a setting to effect a bodily movement of the vehicle, means for cranking the engine including electrical means comprising a switch which is closed when the transmission is established in its neutral setting; and means, including a pressure differential and spring operated switch, supplementing the aforementioned means and cooperating therewith, and operative, after the engine has stalled, to make possible a recranking of the engine, the transmission, at the time, being established in the setting to facilitate a bodily movement of the vehicle.

2. In an automotive vehicle provided with an accelerator, an internal combustion engine and a transmission mechanism which may be established in a neutral setting or in a setting to effect a bodily movement of the vehicle, means for cranking the engine including electrical means comprising a transmission operated switch which is closed when the transmission is established in its neutral setting, and a switch which is closed by a depression of the accelerator and means, including another switch, supplementing the aforementioned means and cooperating therewith and operative, after the intake manifold of the engine has been evacuated at least a certain amount, to effect a closing of the last mentioned switch, the transmission, at the time, being established in the setting to facilitate a bodily movement of the vehicle.

3. In an automotive vehicle provided with an accelerator, an engine including an intake manifold, and a transmission; electrical means for cranking the engine when the accelerator is depressed a certain amount the transmission at the time being established in its neutral setting; and other electrical means, including a power operated switch operative in accordance with the gaseous pressure of the manifold, said other electrical means being operative to cooperative with the aforementioned electrical means in effecting a recranking of the engine after the same has been stalled, the transmission at the time of said stalling being established in any setting other than its neutral setting.

4. In an automotive vehicle provided with a manually operated engine starter switch, an engine, and a transmission; electrical means, including a manually operated switch, for cranking the engine when the starter switch is closed, the transmission at the time being established in its neutral setting; other electrical means, including a power operated switch, operative to cooperate with a portion of the aforementioned electrical means in effecting a recranking of the engine after the latter has been stalled the transmission at the time of said stalling being established in any setting other than its neutral setting; and power means, including a pressure differential operated motor, for controlling the operation of the power operated switch.

5. In an automotive vehicle provided with an accelerator, an ignition switch, an internal combustion engine including an intake manifold, and a transmission; means for cranking the engine when the transmission is established in either its neutral setting or a setting to effect a bodily motion of the vehicle, said means including electrical means comprising, in series, a source of electricity, the ignition switch, a normally open switch which is closed when the transmission is established in its neutral setting, a starter solenoid and an accelerator operated switch; other electrical means, including a control switch, operable to by-pass the transmission operated switch of the aforementioned electrical means; and means, including a vacuum operated motor, for controlling the operation of the control switch whereby the latter is automatically closed when the manifold is sufficiently evacuated and opened shortly after the manifold pressure is increased to or about atmospheric pressure.

6. In an automotive vehicle provided with an accelerator, an engine including an intake manifold, and a change speed transmission; electrical means for cranking the engine when the accelerator is depressed a certain amount the transmission at the time being established in its neutral setting; other electrical means including a power operated switch operative in accordance with the gaseous pressure of the manifold, said other electrical means being operative to cooperate with the aforementioned electrical means in effecting a recranking of the engine after the same has been stalled the transmission at the time being established in any setting other than its neutral setting; and means for controlling the operation of the power operated switch including a pressure differential operated motor having its power element connected with said switch said motor, when energized, serving to close the switch, a spring within the motor operable to hold the switch in its open position, fluid transmitting means interconnecting the motor with the manifold said means including a motor controlling valve mechanism comprising a floating valve member having a bleed orifice therein, and further comprising a spring serving to bias the valve member to its closed position.

7. In an automotive vehicle provided with an accelerator, an engine including an intake manifold, and a change speed transmission; electrical means for cranking the engine when the accelerator is depressed a certain amount the transmission at the time being established in its neutral setting; other electrical means including a power operated switch operative in accordance with the gaseous pressure of the manifold, said other electrical means being operative to cooperate with the aforementioned electrical means in effecting a recranking of the engine after the same has been stalled the transmission at the time being established in any setting other than its neutral setting; and means for controlling the operation of the power operated switch including a pressure differential operated motor having its power element connected with said switch said motor, when energized, serving to close the switch, a spring within the motor operable to hold the switch in its open position, fluid transmitting means interconnecting the motor with the manifold said means including a motor controlling valve mechanism comprising a floating valve member having a bleed orifice therein, and further comprising a spring serving to bias the valve member to its closed position, said power operated switch controlling means further including a vacuum tank connected with the fluid transmitting means, said tank providing a reservoir of vacuum operable to control the switch closing operation of the pressure differential motor.

References Cited in the file of this patent

UNITED STATES PATENTS

| | | |
|---|---|---|
| 2,695,366 | Coffey | Nov. 23, 1954 |
| 2,725,864 | Coffey et al. | Dec. 6, 1955 |
| 2,747,848 | Kehoe | May 29, 1956 |